US010921807B2

(12) United States Patent
Kuffner, Jr.

(10) Patent No.: US 10,921,807 B2
(45) Date of Patent: Feb. 16, 2021

(54) AUTOMATIC RE-ENERGIZATION OF VEHICLES

(71) Applicant: Toyota Research Institute, Inc., Los Altos, CA (US)

(72) Inventor: James J. Kuffner, Jr., Saratoga, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 213 days.

(21) Appl. No.: 15/929,021

(22) Filed: Jun. 18, 2018

(65) Prior Publication Data

US 2019/0384290 A1 Dec. 19, 2019

(51) Int. Cl.
*G05D 1/00* (2006.01)
*G06Q 10/06* (2012.01)
*G05D 1/02* (2020.01)

(52) U.S. Cl.
CPC ......... *G05D 1/0088* (2013.01); *G05D 1/0221* (2013.01); *G06Q 10/06314* (2013.01)

(58) Field of Classification Search
CPC ............... G05D 1/0088; G05D 1/0221; G06Q 10/06314
USPC ........................................... 701/25; 705/7.24
See application file for complete search history.

(56) References Cited

U.S. PATENT DOCUMENTS

| 8,442,758 | B1 | 5/2013 | Rovik et al. |
| 10,065,517 | B1 | 9/2018 | Konrardy et al. |
| 10,395,332 | B1 * | 8/2019 | Konrardy .......... G06F 16/90335 |
| 2011/0130885 | A1 * | 6/2011 | Bowen ...................... H02J 3/14 700/291 |
| 2011/0302092 | A1 | 12/2011 | Basir |
| 2016/0117636 | A1 * | 4/2016 | Miller .................... G06Q 50/30 705/332 |
| 2016/0261425 | A1 * | 9/2016 | Horton ................ H04L 12/2818 |
| 2016/0311410 | A1 * | 10/2016 | Donzis .................. B60K 15/05 |
| 2016/0321740 | A1 * | 11/2016 | Hill ...................... G01C 21/3407 |
| 2017/0262790 | A1 * | 9/2017 | Khasis ................... G08G 1/012 |
| 2018/0072152 | A1 * | 3/2018 | Dudar .................... B67D 7/145 |
| 2018/0238698 | A1 * | 8/2018 | Pedersen ............. G05D 1/0217 |
| 2018/0300823 | A1 * | 10/2018 | Aubuchon ............. G06Q 50/06 |

OTHER PUBLICATIONS

Autonomous Control for Automated Aerial Refueling With Minimum-Time Rendezvous, Burns et al., AIAA Guidance, Navigation and Control Conference and Exhibit Aug. 20-23, 2007, Hilton Head, South Carolina, AIAA 2007-6739 , pp. 1-19 (Year: 2007).*
Booster, "Get gas delivered while you work", printed from https://www.trybooster.com/ on Jun. 15, 2018 in 6 pages.

* cited by examiner

*Primary Examiner* — Timothy Padot
*Assistant Examiner* — Darlene Garcia-Guerra
(74) *Attorney, Agent, or Firm* — Christopher G. Darrow; Darrow Mustafa PC

(57) ABSTRACT

Systems and methods for automatically re-energizing a vehicle. A vehicle determines a current energy source level in the vehicle's energy storage system. When the current energy source level is less than a threshold energy source level, a forthcoming location of the vehicle where the vehicle is non-operational is identified. Additionally, a window of time where the vehicle is located at the forthcoming location is identified. A mobile energy delivery (MED) vehicle is dispatched to the forthcoming location within the window of time to re-energize the vehicle.

20 Claims, 4 Drawing Sheets

AUTOMATIC RE-ENERGIZATION OF VEHICLES

TECHNICAL FIELD

The subject matter described herein relates generally to energy systems in vehicles, and, more specifically, to re-energization of energy storage systems of a vehicle.

BACKGROUND

All vehicles run on some form of energy. In a typical vehicle, energy (such as fuel or batteries) is used to power a prime mover of the vehicle.

Additionally, many vehicles provide some form of an indication of a remaining energy and/or a remaining energy range. Drivers and/or owners are required to monitor the remaining energy/energy range of the vehicle and re-energize the vehicle as needed. This can be problematic, especially in instances where the drivers/owners of the vehicle forget to monitor the remaining energy/energy range. Such instances can result in the vehicle depleting all energy prior to the vehicle arriving at a destination or an energy station (e.g., gas station, battery charge station, etc.).

Further, when the drivers/owners of the vehicle are aware that the vehicle requires re-energization, the drivers/owners must plan a time in their day to travel to the energy station. This is an inconvenience, and can cause scheduling conflicts.

SUMMARY

The present disclosure describes systems and methods for automatically re-energizing a vehicle.

In one example, a system for automatically re-energizing a vehicle is disclosed. The system can include a communications device for communicating with a vehicle and one or more mobile energy delivery (MED) vehicles. The system can also include a processor operatively connected to the communications device. The system can also include memory operatively connected to the processor. The memory can store executable instructions that, when executed by the processor, cause the processor to identify a request for re-energization received from the vehicle via the communications device. The memory can also store instructions to identify, based on data associated with a schedule of a user, 1) a forthcoming location of the vehicle where the vehicle is non-operational, and 2) a window of time where the vehicle is located at the forthcoming location. The memory can also store instructions to identify a MED vehicle of the one or more MED vehicles to dispatch to the forthcoming location within the window of time. The memory can also store instructions to cause the MED vehicle to dispatch to the forthcoming location within the window of time to re-energize the vehicle while the vehicle is located at the forthcoming location.

In another example, a method of automatically re-energizing a vehicle is disclosed. The method can include, when a current energy source level in an energy storage system of a vehicle is less than a threshold energy source level, identifying, based on data associated with a schedule of a user, 1) a forthcoming location of the vehicle where the vehicle is non-operational, and 2) a window of time where the vehicle is located at the forthcoming location. The method can also include, when the current energy source level in the energy storage system of the vehicle is less than the threshold energy source level, causing a mobile energy delivery (MED) vehicle to be dispatched to the forthcoming location of the vehicle within the window of time, where the MED vehicle re-energizes the energy storage system of the vehicle while the vehicle is located at the forthcoming location.

In another example, a method of initiating automatic re-energization of a vehicle is disclosed. The method can include determining a current energy source level in an energy storage system of a vehicle. The method can also include comparing the current energy source level to a threshold energy source level. The method can also include, when the current energy source level is less than the threshold energy source level, determining, based on data associated with a schedule of a user, 1) a forthcoming location of the vehicle where the vehicle is non-operational and 2) a window of time where the vehicle is located at the forthcoming location. The method can also include, when the current energy source level is less than the threshold energy source level, communicating a request to a remote source managing one or more mobile energy delivery (MED) vehicles, the remote source causing a MED vehicle of the one or more MED vehicles to be dispatched to the forthcoming location of the vehicle during the window of time, where the MED vehicle re-energizes the energy storage system of the vehicle while the vehicle is located at the forthcoming location.

DETAILED DESCRIPTION

Systems and methods for automatically re-energizing a vehicle are described. A vehicle determines a current energy source level in the vehicle's energy storage system. When the current energy source level is less than a threshold energy source level, a forthcoming location of the vehicle where the vehicle will remain non-operational is identified. Additionally, a window of time for the vehicle being located at the forthcoming location is identified. A mobile energy delivery (MED) vehicle is dispatched to the forthcoming location within the window of time to re-energize the vehicle.

The arrangements described herein provide a convenient way to re-energize the vehicle. Additionally, the arrangements described herein lessen inconveniences of the driver/owner of the vehicle, since the driver/owner is no longer required to monitor the remaining energy and/or remaining energy range of the vehicle. The arrangements described herein can schedule the re-energization of the vehicle without any assistance/feedback from the driver/owner of the vehicle. Additional benefits will become apparent in the disclosure as follows.

Figure 1:
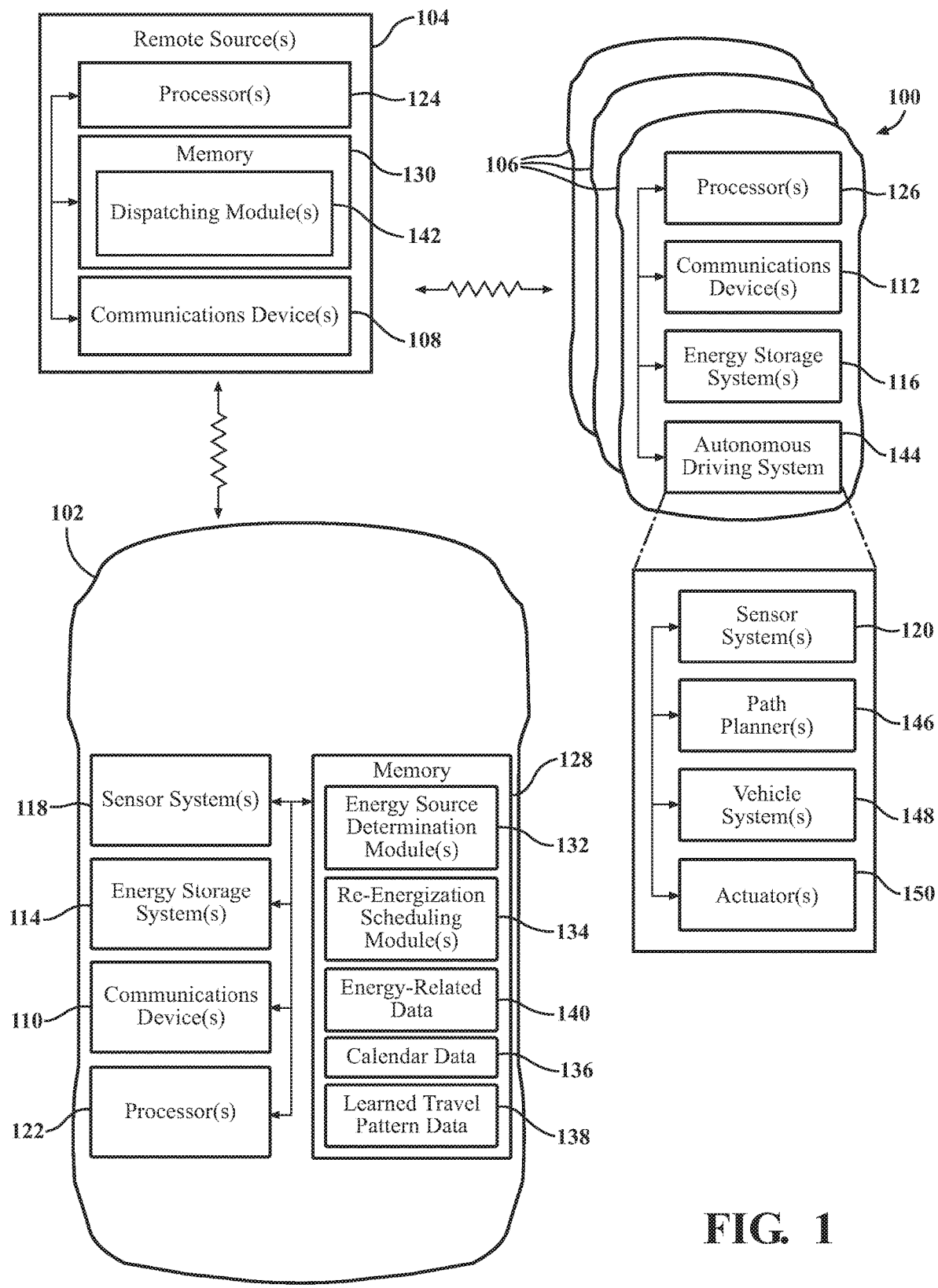
FIG. 1 is a system for automatically re-energizing a vehicle.

Referring to FIG. 1, a system 100 is shown. The system 100 can include a vehicle 102 and one or more remote sources 104. The vehicle 102 and the remote source(s) 104 can be in wireless communication with one another. As used herein, a "vehicle" is any form of motorized transport. In one or more implementations, the vehicle 102 is an automobile.

While arrangements will be described herein with respect to automobiles, it will be understood that embodiments are not limited to automobiles and can include other forms of motorized transport.

The remote source(s) 104 can be a remote server or computer wirelessly connected to the vehicle 102. The remote source(s) 104 can be configured to manage and/or store one or more types of data. For instance, the remote source(s) 104 can be configured to transmit and receive data to and from remote locations, such as the vehicle 102 and/or other remote locations. While one remote source(s) 104 is shown, in some instances, the system 100 may include multiple remote sources 104. In instances such as these, each of the remote sources 104 can be configured to manage specific types of data and tasks. Additionally, each of the multiple remote sources 104 can be configured to communicate with one another.

The system 100 can also include one or more mobile energy delivery (MED) vehicles 106. The MED vehicles 106 can be any vehicle that stores one or more sources of energy that is transferrable to another vehicle. Many components of the MED vehicles 106 will be described in the ensuing portions of the specification. However, some components will be described at the end of the specification for purposes of readability. In some arrangements, the MED vehicles 106 can be manually driven vehicles. In these arrangements, the energy source(s) stored at the MED vehicle(s) 106 can be manually transferred to another vehicle. In other arrangements, the MED vehicles 106 can be autonomous and/or highly automated, as will be discussed in greater detail below. In these arrangements, the energy source(s) stored at the MED vehicle(s) 106 can be automatically transferred to another vehicle (e.g., through automation).

The remote source(s) 104 can be configured to communicate with a plurality of MED vehicles 106 and the vehicle 102. The remote source(s) 104 can include a communications device 108. The communications device 108 is or includes any device, component, or group of devices/components configured to communicate wirelessly with another location. For instance, the communications device 108 can include an antenna tuned to transmit and/or receive data to and/or from another antenna at a frequency. The remote source(s) 104 can transmit data and receive data to one or more remote locations (such as the vehicle 102, MED vehicles 106, etc.) that are not physically connected to the remote source(s) 104 using the communications device 108.

The communications device 108 at the remote source(s) 104 can be configured to communicate with the vehicle 102 and/or the MED vehicle(s) 106. For instance, each of the vehicle 102 and the MED vehicle(s) 106 can include a respective communications device 110, 112. The communications device 110 of the vehicle 102 can include an antenna tuned to exchange data with the antenna of the communications device 108 of the remote source(s) 104. Similarly, the communications device 112 of the MED vehicle(s) 106 can include respective antennas tuned to exchange data with the antenna of the communications device 108 of the remote source(s) 104. In some instances, the communications device 110 for the vehicle 102 can be configured to exchange data with the communications device 112 for the MED vehicle(s) 106. The communications device(s) 108, 110, 112 can communicate via one or more communications networks including, for instance, a cellular network, Bluetooth®, WiFi™, vehicle-to-X (e.g. vehicle-to-vehicle, vehicle-to-infrastructure, etc.) communications, to name a few possibilities. In some arrangements, the vehicle 102 can transmit data to and/or receive data from the remote source(s) 104. In this regard, the vehicle 102, the remote source(s) 104, and the MED vehicle(s) 106 can be configured to exchange data with one another according to various arrangements.

The vehicle 102 can include an energy storage system 114. The energy storage system 114 can include any device, component, and/or group of device(s)/component(s) configured to store one or more sources of energy. For instance, the energy storage system 114 can include a type of fuel (e.g., gasoline). Additionally or alternatively, the energy storage system 114 can include one or more batteries. The fuel and/or batteries can be used to power a prime mover (not shown) of the vehicle 102.

Additionally, each of the MED vehicle(s) 106 can include a respective energy storage system 116. The energy storage system 116 of the MED vehicle(s) 106 can include any device, component, and/or group of device(s)/component(s) configured to store one or more sources of energy that is transferrable to another vehicle. For instance, the MED vehicle(s) 106 can include a battery bank, a large fuel tank, etc. In some arrangements, the MED vehicle(s) 106 may only include one energy storage system 116 for storing one source of energy. In other arrangements, the MED vehicle(s) 106 have include multiple energy storage systems 116 for storing different sources of energy. Additionally, the MED vehicle(s) 106 can include a separate energy storage system 116 for storing an energy source used to power a prime mover (not shown) of the respective MED vehicle 106.

The vehicle 102 and MED vehicle(s) 106 can include respective sensor systems 118, 120. The sensor systems 118, 120 can include one or more sensor(s). "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the vehicle 102 and MED vehicle(s) 106 each include a plurality of sensors, the sensors can work independently from each other. Alternatively, two or more of the sensors can work in combination with each other. In such a case, the two or more sensors can form a sensor network. The sensor(s) can be operatively connected to other device(s)/component(s)/element(s) of the vehicle 102 and MED vehicle(s) 106, respectively. The term "operatively connected," as used throughout this description, can include direct or indirect connections, including connections without direct physical contact.

The sensor system 118, 120 can each include one or more energy source level sensors. The energy source level sensor(s) can be or include any device, component, and/or group of devices and components arranged to determine a current energy source level in the respective energy storage system 114, 116. The energy source level sensor(s) included in the sensor system 118, 120 can depend on the energy storage system 114, 116. For example, the energy source level sensor(s) included in the sensor system 118 of the vehicle 102 can depend on the type of energy source stored in the energy storage system 114.

For instance, where fuel is stored in the energy storage system 114 of the vehicle 102, the sensor system 118 can include one or more fuel level sensors. In one or more arrangements, the fuel level sensor(s) can be or include a potentiometer and a float. In this example, as the fuel level changes, the float moves within a fuel tank of the energy storage system 114. The float moving within the fuel tank can result in changes to the resistance of the potentiometer. As such, the resistance of the potentiometer changes with changes in the fuel level. In one or more arrangements, the fuel level sensor(s) can include a radar, sonar, LIDAR, or other sensor that transmits a signal and generates data responsive to detecting the transmitted signal. In this example, the fuel level sensor(s) can be mounted near the inlet of the fuel tank. The fuel level sensor(s) can transmit a signal towards fuel in the fuel tank. The signal can be reflected off the fuel and received by the fuel level sensor(s). The fuel level sensor(s) can generate data corresponding to the time it takes to receive the transmitted signal. Based on the data, the fuel level sensor(s) can determine a fuel level in the fuel tank. Although these two examples are provided for certain types of fuel level sensor(s), many other types of fuel level sensor(s) may be used. Accordingly, the present disclosure is not limited to these types of fuel level sensor(s).

As another example, where the energy storage system 114 of the vehicle 102 includes one or more batteries, the sensor system 118 can include one or more battery charge sensors. The battery charge sensor(s) can be configured to monitor, detect, and/or assess an amount of chemical energy stored on the batteries. In one example, the energy storage system 114 can include one or more sensors to detect an open circuit potential (e.g., the electrical potential between an anode and a cathode for the one or more batteries). Additionally or alternatively, the energy storage system 114 can include one or more sensors to detect a closed circuit potential (e.g., the electrical potential across a known load on the one or more batteries). As another example, the energy storage system 114 can include a sensor to measure an amount of battery discharge over time (for instance, a coulomb counter). While these examples are provided, many alternative sensor arrangements may be implemented in the energy storage system 114 to determine a current energy source level of the one or more batteries.

In each of these examples, the sensor system 118 of the vehicle 102 can include one or more energy source level sensor(s) configured to acquire data corresponding to current energy source level in the energy storage system 114. Similar examples can be provided for the energy storage system 116 of the MED vehicle(s) 106.

The system 100 includes one or more processors 122, 124, 126. The processor(s) 122, 124, 126 are configured to implement or perform various functions described herein. In some implementations, one or more of the processor(s) 122 can be included in the vehicle 102, one or more of the processor(s) 124 can be included at the remote source(s) 104, and/or one or more processor(s) 126 can be included in the MED vehicles 106. In one or more arrangements, the processor(s) 122, 124, 126 can be a main processor of the vehicle 102/remote source(s) 104/MED vehicles 106. For instance, the processor(s) 122, 126 can be an electronic control unit (ECU). While shown as being implemented within the vehicle 102, remote source(s) 104, and MED vehicles 106, in some instances the processor(s) 122, 124, 126 can be located remotely and accessible via the respective communications device 108, 110, 112. Furthermore, in some implementations, the processor(s) 122, 124, 126 can be the same processor. In this regard, all of the functions described herein can be performed by the same component. In these implementations, the processor can be included in the vehicle 102, the remote source(s) 104, or any one of the MED vehicles 106.

The system 100 can include memory for storing one or more types of data. The memory can include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The memory can be a component of the processor(s), or the memory can be operatively connected to the processor(s) for use thereby.

In some instances, the memory can be located wholly on the vehicle 102 and/or the remote source(s) 104. In other instances, such as that shown in FIG. 1, memory 128 can be included on the vehicle 102, and memory 130 can be included at the remote source(s) 104. Additionally, though not shown, the MED vehicle(s) 106 can also include memory.

In one or more arrangements, the memory can include various instructions stored thereon. In one or more arrangements, the memory can store one or more modules. Modules can be or include computer-readable instructions that, when executed by the processor(s), cause the processor(s) to perform the various functions disclosed therein. While the modules will be described herein with reference to functions for purposes of brevity, it should be understood that the modules include instructions that cause the processor(s) to perform the described functions. Furthermore, although some modules are shown as being provided on the memory 128 for the vehicle 102, those modules can be stored in memory 130 for the remote source(s) 104, for instance. In these arrangements, the processor(s) 124 of the remote source(s) 104 can execute the functions of the modules. Additionally or alternatively, the processor(s) 122 of the vehicle 102 can access the remote source(s) 104 to receive the instructions from the modules, and the processor(s) 122 of the vehicle 102 can execute those instructions.

In one or more implementations, the memory 128 of the vehicle 102 can include one or more energy source level determination modules 132. The energy source level determination module(s) 132 can include instructions that, when executed by the processor(s) 122, cause the processor(s) 122 to determine a current energy source level within the energy storage system 114 of the vehicle 102. While shown as being included in the memory 128 of the vehicle 102, in some implementations, the energy source level determination module(s) 132 can be stored on the memory 130 of the remote source(s) 104. In these implementations, the processor(s) 124 of the remote source 104 can execute the instructions described with reference to the energy source level determination module(s) 132.

The processor(s) 122 can use data captured by the energy source level sensor(s) of the sensor system 118 to determine the current energy source level. The current energy source level can be reflected as a percentage full (or empty). Additionally, where the energy source stored is fuel (such as gasoline), the current energy source level can be reflected as a volume of fuel. Further, where the energy source stored is battery charge, the current energy source level can be reflected as a number of amp-hours. While these examples are provided, the current energy source level of the energy storage system 114 of the vehicle 102 can be reflected in a number of different ways.

In one or more implementations, the memory 128 of the vehicle 102 can include one or more re-energization scheduling modules 134. The re-energization scheduling module(s) 134 can include instructions that, when executed by the processor(s) 122, cause the processor(s) 122 to schedule re-energization of the vehicle 102 at a forthcoming location of the vehicle 102. While shown in FIG. 1 as being included on the memory 128 of the vehicle 102, in some implementations, the re-energization scheduling module(s) 134 can be stored on the memory 130 of the remote source(s) 104.

The re-energization scheduling module(s) 134 can include instructions to compare the current energy source level determined via the instructions from the energy source level determination module(s) 132 to a threshold energy source level. The threshold energy source level can be predetermined (e.g., set by the OEM). Additionally or alternatively, the threshold energy source level can be set by the owner/driver of the vehicle 102 (or the predetermined threshold energy source level can be modified by the owner/driver of the vehicle 102). The setting or the modification of the threshold energy source level can be made via the owner's/driver's mobile device, web interface, etc. In some instances, the threshold energy source level can be adaptive based on a trip, schedule, or commute of the vehicle 102. For instance, the threshold energy source level can be greater where the vehicle 102 has a longer commute, will be driven (or drive) more for a particular day of a schedule, or a long distance trip is planned. Obtaining this information will be discussed in further detail below.

The re-energization scheduling module(s) 134 can include instructions to determine whether the current energy source level is less than (or equal to) the threshold energy source level. The re-energization scheduling module(s) 134 can include instructions to schedule re-energization of the vehicle 102 if the current energy source level is less than the threshold energy source level.

The re-energization scheduling module(s) 134 can include instructions to determine one or more forthcoming locations of the vehicle 102. Forthcoming location, as used herein, is a location along a route traveled upon by the vehicle 102. For instance, the vehicle 102 may be traveling to a destination from a current location, and the vehicle 102 may have one or more waypoints between the destination and the current location of the vehicle 102. In this example, the forthcoming locations may be all locations beyond the current location of the vehicle 102 (including the waypoints) up to and including the destination. The forthcoming locations are not limited to a current route being traveled upon (e.g., the forthcoming locations are not temporally constrained in the future). Thus, the forthcoming locations may be a location along a route that the vehicle 102 will travel upon at a different time. For example, a vehicle 102 may be located at an owner's home for the night, and the vehicle 102 may travel to the owner's place of business the next morning. In this example, forthcoming locations of the vehicle 102 may include locations between the owner's home and the owner's place of business.

In one or more arrangements, the re-energization scheduling module(s) 134 can include instructions to determine the forthcoming location(s) based on a schedule of a user. In some instances, the schedule of the user may be based on the user's calendar. In other instances, the schedule can be based on the user's daily habits. Each of these instances will be discussed in further detail below.

In one or more arrangements, the memory 128 of the vehicle 102 can store calendar data 136. The calendar data 136 can be or include data associated with a schedule of a user. The user can be the owner/driver of the vehicle 102. While shown as saved on the memory 128 of the vehicle 102, in some instances, the calendar data 136 can be stored on memory 130 at the remote source(s) 104, on a mobile device (not shown) for the user, etc. In these examples, the calendar data 136 can be accessible by the processor(s) 122, 124 using a respective communications device(s) 110, 108. The calendar data 136 can include appointments, meetings, etc., durations associated therewith, and/or locations associated therewith. As one example, the calendar data 136 associated with the schedule of the user may include data that indicates the user has a doctor's appointment from 9:30 AM-11:00 AM at the doctor's office, and the user has a meeting from 11:30 AM-12:00 PM at the user's place of business. The calendar data 136 can be used by the processor(s) 122, 124 to determine forthcoming locations of the vehicle 102.

In one or more arrangements, the memory 128 of the vehicle 102 can store learned travel pattern data 138. The learned travel pattern data 138 can be or include data that corresponds to a routine associated with the vehicle 102. The processor(s) 122 can record locations of the vehicle 102 and store these recorded locations in memory 128. The processor(s) 122 can also record times associated with the recorded locations (e.g., the processor(s) 122, 124 can timestamp the recorded locations). The locations can be recorded routinely, randomly, constantly or near-constantly, etc. The processor(s) 122 can identify patterns in the recorded locations and associated times of the vehicle 102. As one example, the vehicle 102 may visit a particular coffee shop every morning at 8:30 AM prior to the user arriving at work at 9:00 AM. As another example, the vehicle 102 may leave the user's place of business every day between 12:00 PM and 12:45 PM. The processor(s) 122, 124 can store the identified patterns in memory 128 as learned travel pattern data 138. Similar to the calendar data 136, while the learned travel pattern data 138 is shown as saved on the memory 128 of the vehicle 102, in some instances, the learned travel pattern data 138 can be stored on memory 130 at the remote source(s) 104, on a mobile device (not shown) for the user, etc. In these examples, the learned travel pattern data 138 can be accessible by the processor(s) 122, 124 using the respective communications device(s) 110, 108. The learned travel pattern data 138 can also be used to determine forthcoming locations of the vehicle 102.

As an example, the user may typically depart from home at 8:15 AM, typically make a half-hour stop (from 8:20 AM to 8:50 AM) at a local coffee shop, and leave the local coffee shop to arrive at the user's place of business by 9:00 AM. Additionally, the user may have a dentist appointment from 1:00 PM to 2:00 PM. This calendar and routine may be represented in data stored on memory 128. Continuing the example, the typical departure time (of 8:15 AM) and the half-hour stop (from 8:20 AM-8:50 AM) may be represented in the learned travel pattern data 138. Additionally, the dentist appointment (from 1:00 PM to 2:00 PM) may be represented in the calendar data 136.

The re-energization scheduling module(s) 134 can include instructions to determine a forthcoming location where the vehicle 102 is non-operational. Non-operational, as used herein, is a state of the vehicle 102 where the vehicle 102 is not currently being operated by a driver or autonomously (in instances where the vehicle 102 is an autonomous or highly automated vehicle). The vehicle 102 may be non-operational when the vehicle 102 is parked. Additionally, the vehicle 102 may be non-operational when the vehicle 102 is turned off and/or vacant.

In one or more arrangements, the re-energization scheduling module(s) 134 can include instructions to access and/or identify the user's schedule to determine the forthcoming locations where the vehicle 102 is non-operational. In some arrangements, the re-energization scheduling module(s) 134 can include instructions to access the calendar data 136 to determine forthcoming locations where the vehicle 102 is non-operational. Additionally or alternatively, the re-energization scheduling module(s) 134 can include instructions to access the learned travel pattern data 138 to determine forthcoming locations where the vehicle 102 is non-operational. Additionally or alternatively, the re-energization scheduling module(s) 134 can include instructions to access data provided to a navigation system (not shown) to determine forthcoming locations where the vehicle 102 is non-operational. In all of these arrangements, the re-energization scheduling module(s) 134 can include instructions to determine forthcoming locations of the vehicle 102 where the vehicle 102 is not currently being operated by a driver and/or autonomously. Continuing the previous example, the vehicle 102 is non-operational prior to the user's typical departure time (e.g., prior to 8:15 AM), while the vehicle 102 is stopped at the local coffee shop (from 8:20 AM to 8:50 AM), and while the vehicle 102 is at the user's place of business (after 9:00 AM). Additionally, the vehicle 102 is non-operational while the vehicle 102 is located at the dentist's office (from 1:00 PM-2:00 PM).

The re-energization scheduling module(s) 134 can include instructions to determine a window of time where the vehicle 102 is located at a respective forthcoming location. For example, the re-energization scheduling module(s) 134 can include instructions to determine a time when the vehicle 102 will arrive at the respective forthcoming location. Additionally, the re-energization scheduling module(s) 134 can include instructions to determine a duration that the vehicle 102 remains at the respective forthcoming location. In some instances, the duration may be the duration the vehicle 102 remains non-operational while located at the respective location. Similar to determining forthcoming locations of the vehicle 102, the re-energization scheduling module(s) 134 can include instructions to use the calendar data 136, learned travel pattern data 138, and/or navigation data to determine a duration the vehicle 102 is located at the respective forthcoming location. In some instances, the duration may be an estimated duration. In these instances, the duration may be estimated based on past durations as indicated in the learned travel pattern data 138. For example, if the vehicle 102 typically stops at the coffee shop between 8:20 AM and 8:50 AM, the estimated duration may be 30 minutes. In other instances, the duration may be determined based on the calendar data 136. For example, the calendar data 136 may include data indicating the user has a dentist appointment between 1:00 PM-2:00 PM. Accordingly, the determined duration may be one hour. In each of these examples, the arrival time and the duration that the vehicle 102 is located at the forthcoming location form the window of time.

The re-energization scheduling module(s) 134 can include instructions to compare the window of time to a threshold window. The threshold window can be a threshold window of time that corresponds to the minimum duration needed to re-energize a vehicle. The threshold window can be different based on the type of energy being transferred to a vehicle. For instance, refueling a vehicle may take less time than recharging a vehicle. Accordingly, the threshold window for refueling a vehicle may be less than the threshold window for recharging a vehicle. The re-energization scheduling module(s) 134 can include instructions to determine the type of energy source stored in the energy storage system 114 of the vehicle 102. For instance, the memory 128 of the vehicle 102 can store energy-related data 140. The energy-related data 140 can include, at least, data corresponding to the type of energy source stored in the energy storage system 114 of the vehicle 102. The re-energization scheduling module(s) 134 can include instructions to access the energy-related data 140 to determine the type of energy source stored in the energy storage system 114 of the vehicle 102. The re-energization scheduling module(s) 134 can include instructions to determine the threshold window based on the type of energy source stored in the energy storage system 114 of the vehicle 102.

The re-energization scheduling module(s) 134 can include instructions to provide the forthcoming location and window of time to the remote source(s) 104 when the window of time that the vehicle 102 is located at the forthcoming location exceeds (or meets) the threshold window. In some instances, the re-energization scheduling module(s) 134 can include instructions to provide the type of energy source stored in the energy storage system 114 of the vehicle 102 to the remote source(s) 104 along with the forthcoming location and the window for time.

In one or more implementations, the memory 130 of the remote source(s) 104 can store one or more dispatching modules 142. The dispatching module(s) 142 can include instructions that, when executed by the processor(s) 124, cause the processor(s) 124 to dispatch an MED vehicle 106 to the forthcoming location of the vehicle 102 within the window of time.

The dispatching module(s) 142 can include one or more rules for selecting a particular MED vehicle 106 where a plurality of MED vehicles 106 are included in the system 100.

In one or more arrangements, the dispatching module(s) 142 can include a first rule to select an MED vehicle 106 of the plurality of MED vehicles 106 that stores the type of energy source stored in the energy storage system 114 of the vehicle 102. For instances, the dispatching module(s) 142 can include instructions to use the energy-related data 140 to determine the type of energy source stored in the energy storage system 114 of the vehicle 102. The dispatching module(s) 142 can include instructions to compare the type of energy source stored in the energy storage system 114 of the vehicle 102 to the types of energy source(s) stored in the energy storage system 116 of each MED vehicles 106. The dispatching module(s) 142 can include instructions to identify those MED vehicles 106 that store the same type of energy source as the type of energy source stored in the energy storage system 114 of the vehicle 102.

The dispatching module(s) 142 can include a second rule to select an MED vehicle 106 of the plurality of MED vehicles 106 that has a sufficient amount of an energy source stored in their respective energy storage system 116. The dispatching module(s) 142 can include instructions to determine a quantity of energy required by the vehicle 102. Such information can be provided to (or accessed by) the remote source(s) 104 from the energy-related data 140. The dispatching module(s) 142 can include instructions to compare the quantity of energy required by the vehicle 102 to the quantity of energy source stored in the energy storage system 116 of the MED vehicles 106 identified following execution of the first rule. The dispatching module(s) 142 can include instructions to identify those MED vehicles 106 that have a quantity of energy source stored in the energy storage system 116 that exceeds (or meets) the quantity of energy source required by the vehicle 102.

The dispatching module(s) 142 can include a third rule to select an MED vehicle 106 that is not previously scheduled to re-energize a different vehicle during the window of time that the vehicle 102 is to be re-energized. The dispatching module(s) 142 can include instructions for maintaining a schedule of each of the MED vehicles 106. The dispatching module(s) 142 can compare the schedule of the MED vehicles 106 with the window of time associated with the vehicle 102. The dispatching module(s) 142 can include instructions to identify those MED vehicles 106 having a schedule that does not conflict with the window of time associated with the vehicle 102.

The dispatching module(s) 142 can include a fourth rule to select an MED vehicle 106 that is in closest proximity to the vehicle 102. Additionally or alternatively, fourth rule can be to select the MED vehicle 106 that can arrive to at the forthcoming location of the vehicle 102 earliest in the window of time. The dispatching module(s) 142 can include instructions to identify a location (either current or forthcoming) of the MED vehicles 106.

The dispatching module(s) 142 can include instructions to dispatch an MED vehicle 106 to the forthcoming location of the vehicle 102 within the window of time following execution of the first rule, second rule, third rule, and/or fourth rule. The dispatching module(s) 142 can include instructions to communicate data corresponding to the forthcoming location and window of time (and, in some instances, the type of energy source) to the identified MED vehicle 106. The identified MED vehicle 106 can receive the forthcoming location and window of time via the communications device(s) 112 of the MED vehicle 106. The identified MED vehicle 106 can travel (either autonomously using the autonomous driving system 144 as will be discussed in greater detail below, or manually by a driver) to the forthcoming location and arrive at the forthcoming location within the window of time. The MED vehicle 106 can re-energize the vehicle 102 using the type of energy source stored in the energy storage system 114 of the vehicle 102.

Figure 2:
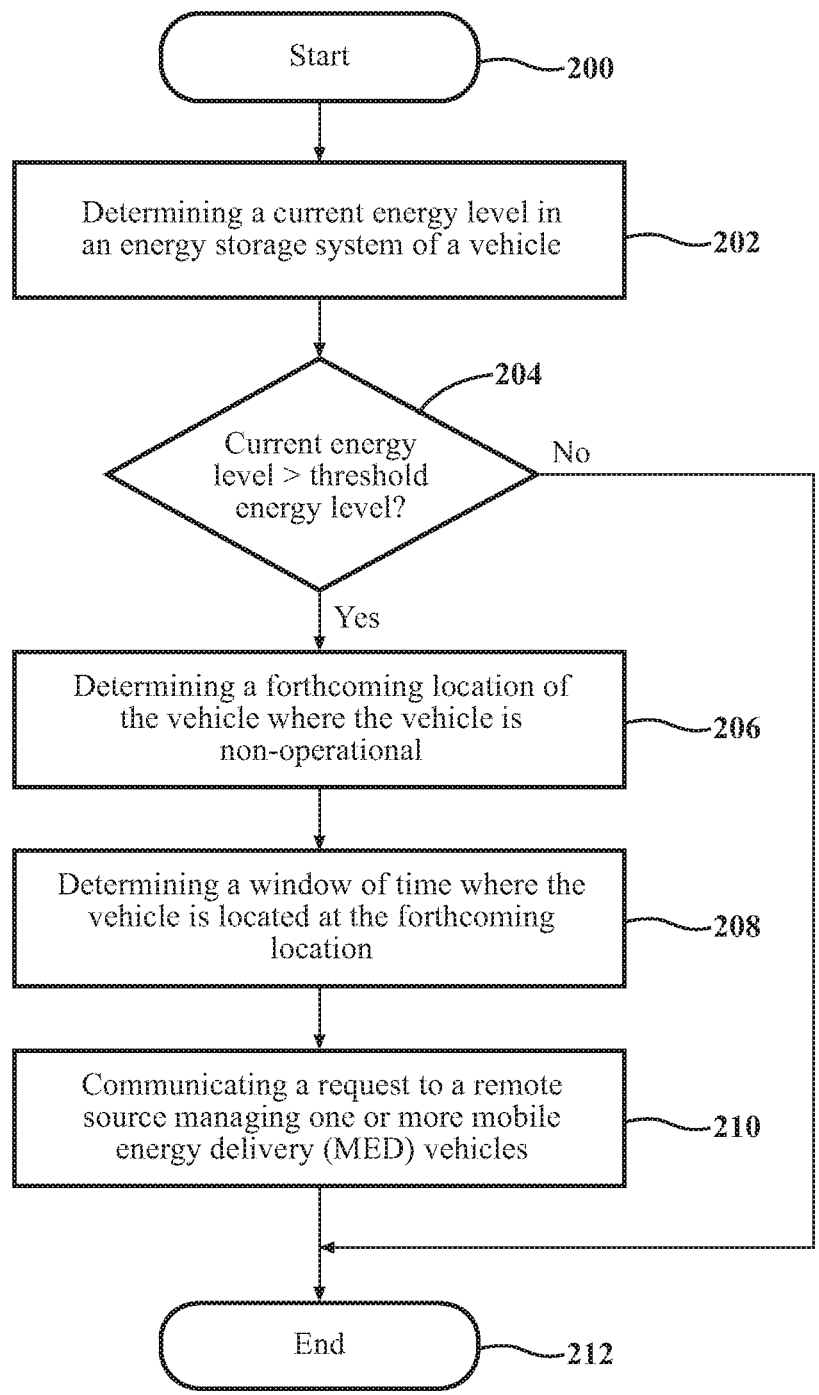
FIG. 2 is flowchart showing an example method of automatically re-energizing the vehicle.
Figure 3:
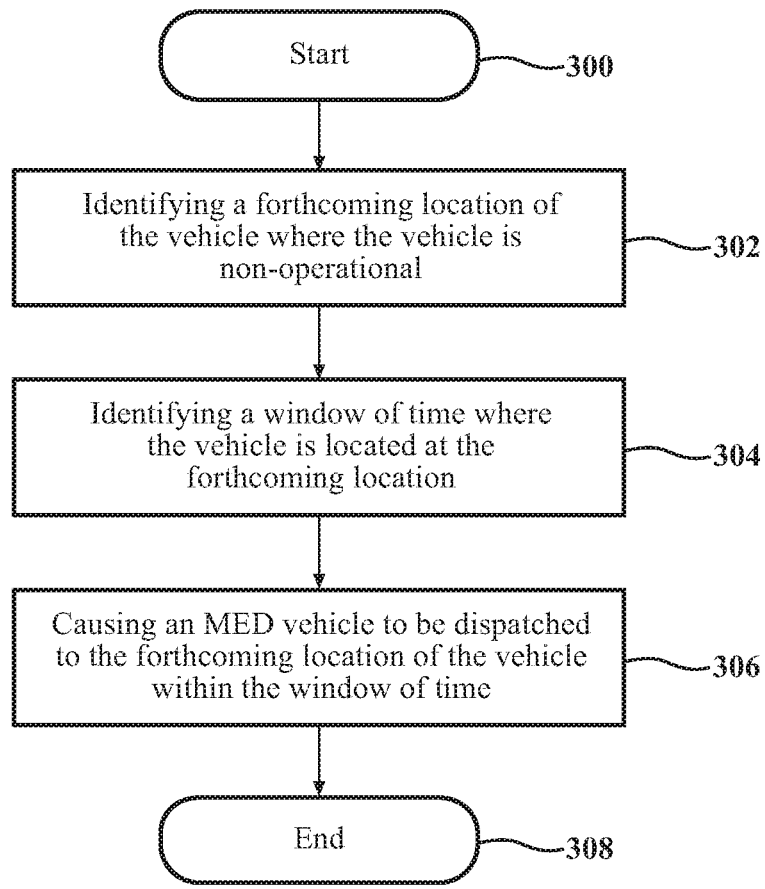
FIG. 3 is a flowchart showing an example method of initiating automatic re-energization of the vehicle.

Now that various aspects of the system 100 have been described, a method of initiating automatic re-energization of the vehicle 102 will be described with reference to FIG. 2, and a method of automatically re-energizing the vehicle 102 will be described with reference to FIG. 3. The flowcharts shown in FIG. 2 and FIG. 3 are only for purposes of providing example methods. The following disclosure should not be limited to each and every function block shown in FIG. 2 and FIG. 3. To the contrary, the methods do not require each and every function block shown. In some examples, the methods may include additional function blocks. Further, the methods do not need to be performed in the same chronological order shown in FIG. 2 and FIG. 3.

Referring now to FIG. 2, a flowchart showing an example method of initiating automatic re-energization of the vehicle 102 is shown. The method can begin at starting block 200. The method can begin when the vehicle 102 is turned on. Additionally or alternatively, the method can begin when the vehicle 102 is driven (either autonomously or manually). The method can proceed to function block 202.

At function block 202, the processor(s) 122 can determine a current energy source level in the energy storage system 114 of the vehicle 102 using instructions from the energy source level determination module(s) 132. The processor(s) 122 can receive data from the energy source level sensor(s) of the sensor system 118 to determine the current energy source level in the energy storage system 114. The method can proceed to decision block 204.

At decision block 204, the processor(s) 122 can determine whether the current energy source level in the energy storage system 114 of the vehicle 102 is less than (or equal to) a threshold energy source level using instructions from the re-energization scheduling module(s) 134. As stated above, the threshold energy source level can be predetermined (e.g., set by the OEM). Additionally or alternatively, the threshold energy source level can be set by the owner/driver of the vehicle 102 (or the predetermined threshold energy source level can be modified by the owner/driver of the vehicle 102). In some instances, the threshold energy source level can be adaptive based on a trip, schedule, or commute of the vehicle 102. If the current energy source level is less than (or equal to) the threshold energy source level, the method can proceed to function block 206. However, if the current energy source level is not less than (or equal to) the threshold energy source level, the method can proceed to ending block 212.

At function block 206, the processor(s) 122 can determine a forthcoming location of the vehicle 102 where the vehicle 102 is non-operational using instructions from the re-energization scheduling module(s) 134. The processor(s) 122 can access and/or identify the user's schedule to determine the forthcoming location where the vehicle 102 is non-operational. The processor(s) 122 can access the calendar data 136, learned travel pattern data 138, navigation data, and/or other data for determining a forthcoming location of the vehicle 102 where the vehicle is non-operational. The method can proceed to function block 208.

At function block 208, the processor(s) 122 can determine a window of time where the vehicle 102 is located at the forthcoming location identified at function block 206. The window of time can be determined using instructions from the re-energization scheduling module(s) 134. The processor(s) 122 can determine an arrival time for the vehicle 102 arriving at the forthcoming location. The processor(s) 122 can determine a duration that the vehicle 102 will be located at the forthcoming location. Using the arrival time and the duration, the processor(s) 122 can determine the window of time that the vehicle 102 will be located at the forthcoming location. The method can proceed to function block 210.

At function block 210, the processor(s) 122 can communicate a request to the remote source(s) 104 that manages the one or more MED vehicle(s) 106. The processor(s) 122 can communicate the request through the communications device(s) 110 using instructions from the re-energization scheduling module(s) 134. The request can include the forthcoming location determined at function block 206. The request can also include the window of time determined at function block 208. The request can include additional information, such as the energy source used to re-energize the vehicle 102. The remote source(s) 104 can dispatch an MED vehicle 106 to the forthcoming location of the vehicle 102 within the window of time. The MED vehicle 106 can re-energize the vehicle 102 while the vehicle 102 is located at the forthcoming location. From function block 210 and instances where the current energy source level is not less than the threshold energy source level, the method can proceed to ending block 212.

At ending block 212, the method can end. The method can end when the vehicle 102 has sufficient energy (e.g., the current energy source level is greater than the threshold energy source level).

Referring now to FIG. 3, a flowchart showing an example method of automatically re-energizing the vehicle 102 is shown. The method can begin at starting block 300. The method can begin when a request for re-energization is received. The request for re-energization may be received from the vehicle 102 via the communications device(s) 108. The request for re-energization may be received by the remote source(s) 104. Additionally or alternatively, the request for re-energization may be received by the communications device 112 of an MED vehicle 106. The method can proceed to function block 302.

At function block 302, the processor(s) 124, 126 can identify a forthcoming location of the vehicle 102 where the vehicle 102 is non-operational. The forthcoming location may be contained in the request received at the starting block. Accordingly, the forthcoming location may be identified within the request. Additionally or alternatively, the processor(s) 124, 126 can determine the forthcoming location of the vehicle 102 where the vehicle 102 is non-operational. In this example, the processor(s) 124, 126 can perform functions similar to those described with respect to function block 206 of FIG. 2. The method can proceed to function block 304.

At function block 304, the processor(s) 124, 126 can identify a window of time that the vehicle will be located at the forthcoming location identified at function block 302. The window of time may be contained in the request received at the starting block. Accordingly, the window of time may be identified within the request. Additionally or alternatively, the processor(s) 124, 126 can determine the window of time where the vehicle 102 is located at the forthcoming location determined at function block 302. In this example, the processor(s) 124, 126 can perform functions similar to those described with respect to function block 208 of FIG. 2. The method can proceed to function block 306.

At function block 306, the processor(s) 124, 126 can cause an MED vehicle 106 to dispatch to the forthcoming location within the window of time. In one or more arrangements (such as those where portions of the method are implemented at the remote source(s) 104), the processor(s) 124 at the remote source(s) 104 can issue instructions to a MED vehicle 106 to dispatch to the forthcoming location of the vehicle 102. In other arrangements, the processor(s) 122 at the vehicle 102 can issue instructions to the remote source(s) 104, and the processor(s) 124 at the remote source(s) 104 can cause the MED vehicle 106 to dispatch to the forthcoming location. In still other arrangements, the processor(s) 122 at the vehicle 102 can issue instructions to an MED vehicle 106, and the MED vehicle 106 can dispatch to the forthcoming location. The MED vehicle 106 dispatched to the forthcoming location can arrive during the window of time and can re-energize the vehicle 102 while the vehicle 102 is located at the forthcoming location. The method can proceed to ending block 308.

At ending block 308, the method can end. The method can end when the vehicle 102 has sufficient energy (e.g., the current energy source level is greater than the threshold energy source level).

Figure 4:
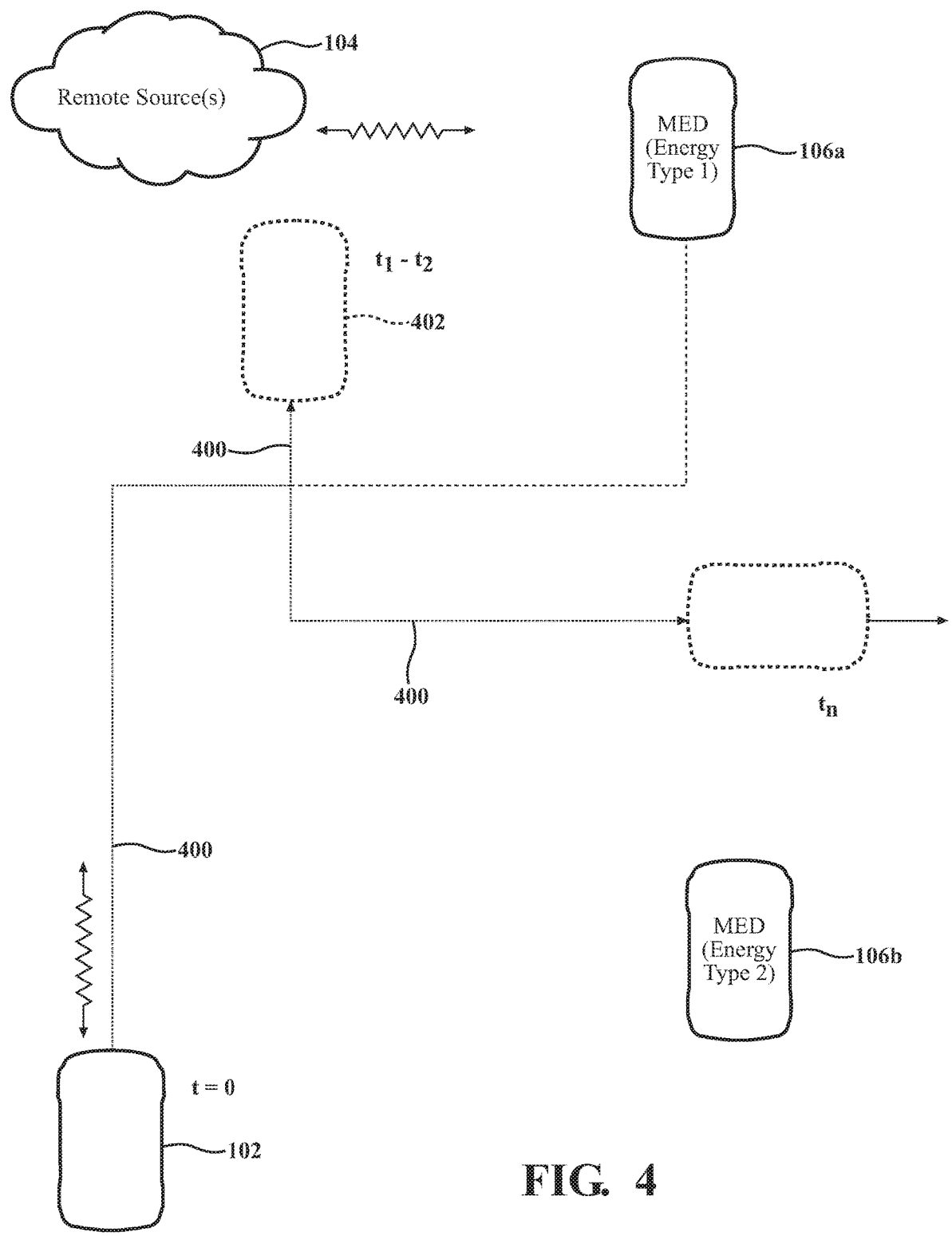
FIG. 4 is an example environment within which the disclosed systems/methods may be implemented.

Referring now to FIG. 4, an example environment is shown within which the disclosed systems and methods may be implemented. The following example is provided for adding clarity to the present disclosure. However, the present disclosure should not be construed to be limited to this example.

As shown in FIG. 4, the vehicle 102 is located at a first location. The first location may be at an initial time (e.g., t=0). The vehicle 102 is shown at the start of a route 400. In some instances, the vehicle 102 may be in route to the destination. In other instances, the vehicle 102 may be non-operational prior to departing for the destination. In the example shown in FIG. 4, the route 400 may be a route to the owner/driver's place of business. The vehicle 102 may be powered by gasoline. Additionally, the vehicle 102 may have a current energy source level of two gallons of gasoline. The threshold energy source level may be three gallons of gasoline. Accordingly, the current energy source level is less than the threshold energy source level.

Using the instructions from the energy source level determination module(s) 132, the processor(s) 122 determine the current energy source level using the data from the energy level sensor(s) of the sensor system(s) 118.

Using instructions from the re-energization scheduling module(s) 134, the processor(s) 122 determine that the current energy source level is less than the threshold energy source level. Additionally, the processor(s) 122 determine forthcoming locations along the route 400. In this example, the vehicle 102 may typically stop at a local coffee shop (e.g., at location 402) for 30 minutes (e.g., $t_1$-$t_2$). Data corresponding to this habit can be saved in learned travel pattern data 138. As another example, the user may have a calendar entry at the user's dentist office for one hour (e.g., $t_1$-$t_2$). Data corresponding to this calendar entry can be saved in calendar data 136. In these and other examples, the vehicle 102 may be located at a forthcoming location 402 where the vehicle 102 is non-operational. The processor(s) 122 can access the calendar data 136, and/or learned travel pattern data 138 to identify the forthcoming location 402. Additionally, the vehicle 102 may be non-operational for a window of time (e.g., $t_1$-$t_2$) that meets or exceeds a threshold window. The threshold in this example may be relatively short, since the vehicle 102 is powered by gasoline. The processor(s) 122 can send a request for re-energization to the remote source(s) 104. The request can include the forthcoming location 402 and the window of time $t_1$-$t_2$. The request can also include the type of energy source (e.g., gasoline). The remote source(s) 104 can receive the request, and the processor(s) 124 at the remote source(s) 104 can select a MED vehicle 106 to dispatch to the forthcoming location 402 within the window of time $t_1$-$t_2$. The processor(s) 124 at the remote source(s) 104 can select the MED vehicle 106 based on the type of energy source stored in the energy storage system 116 of the MED vehicle 106 being the same as the type of energy source stored in the energy storage system 114 of the vehicle 102. In this example, the MED vehicle 106a may store gasoline, whereas the MED vehicle 106b may store batteries.

The MED vehicle 106a can then be dispatched to the forthcoming location 402. The MED vehicle 106a can arrive at the forthcoming location 402 within the window of time $t_1$-$t_2$. The MED vehicle 106a can re-energize the vehicle 102 while the vehicle 102 is located at the forthcoming location 402 (e.g., fill the energy storage system 114 of the vehicle 102 with gasoline). Following re-energization, the vehicle 102 proceeds to the destination at $t_n$.

Referring back to FIG. 1, in one or more examples, the MED vehicle(s) 106 can be autonomous vehicles. As used herein, "autonomous vehicle" refers to a vehicle that operates in an autonomous mode. "Autonomous mode" means one or more computing systems are used to navigate, maneuver, and/or control the MED vehicle(s) 106 along a travel route or path with minimal or no input from a human driver. In one or more examples, the MED vehicle(s) 106 can be highly automated or completely automated. In one or more arrangements, the MED vehicle(s) 106 can be configured with an autonomous driving system 144 having one or more computing systems to perform a portion of the navigation and/or maneuvering of the MED vehicle(s) 106 along a travel route, and a vehicle operator (i.e., a human driver) provides inputs to the MED vehicle(s) 106 to perform a portion of the navigation and/or maneuvering of the MED vehicle(s) 106.

The autonomous driving system 144 can have one or more semi-autonomous operational modes in which a portion of the navigation and/or maneuvering of the MED vehicle(s) 106 along a travel route is performed by one or more computing systems, and a portion of the navigation and/or maneuvering of the MED vehicle(s) 106 along a travel route is performed by a human driver. One example of a semi-autonomous operational mode is when an adaptive cruise control system is activated. In such case, the speed of the vehicle can be automatically adjusted to maintain a safe distance from a vehicle ahead based on data received from on-board sensors, but the vehicle is otherwise operated manually by a human driver. Upon receiving a driver input to alter the speed of the vehicle (e.g. by depressing the brake pedal to reduce the speed of the vehicle), the adaptive cruise control system is deactivated and the speed of the vehicle is reduced.

In some instances, the autonomous driving system 144 can be configured to selectively switch between various operational modes (e.g., an autonomous mode, one or more semi-autonomous modes, and/or a manual mode). Such switching can be implemented in a suitable manner, now known or later developed. The switching can be performed automatically, selectively, or it can be done responsive to receiving a manual input or request.

The autonomous driving system 144 can include one or more path planners 146. The path planner(s) 146 can include instructions to communicate with the various vehicle systems 148. In one or more arrangements, the processor(s) 126 can be operatively connected to communicate with the various vehicle systems 148 and/or individual components thereof according to, at least in part, instructions included on the path planner(s) 146. For example, the processor(s) 126 can be in communication to send and/or receive information from the various vehicle systems 148 to control the movement, speed, maneuvering, heading, direction, etc. of the MED vehicle(s) 106. The processor(s) 126 can control some or all of these vehicle systems 148 and, thus, the MED vehicle(s) 106 can be partially or fully autonomous.

The processor(s) 126 can be operable to control the navigation and/or maneuvering of the MED vehicle(s) 106 by controlling one or more of the MED vehicle(s) 106 systems and/or components thereof. For instance, when operating in an autonomous or semi-autonomous mode, the processor(s) 126 can control the direction and/or speed of the MED vehicle(s) 106 based, at least in part, on instructions from the path planner(s) 146. The path planner(s) 146 can include instructions that cause the MED vehicle(s) 106 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action can occur, either in a direct or indirect manner.

The autonomous driving system 144 can include one or more actuators 150. The actuators 150 can be any element or combination of elements operable to modify, adjust and/or alter one or more of the MED vehicle(s) 106 systems or components thereof responsive to receiving signals or other inputs from the processor(s) 126, the path planner(s) 146, and/or other module(s). Any suitable actuator can be used. For instance, the one or more actuators 150 can include motors, pneumatic actuators, hydraulic pistons, relays, solenoids, and/or piezoelectric actuators, just to name a few possibilities.

In one or more arrangements, the path planner(s) 146 can be configured to receive data from sensor system(s) 120 of the MED vehicle(s) 106 and/or any other type of system capable of capturing information relating to the MED vehicle(s) 106 and/or the external environment of the MED vehicle(s) 106. In one or more arrangements, the path planner(s) 146 can use such data to generate one or more driving scene models. The path planner(s) 146 can determine position and velocity of the MED vehicle(s) 106. The path planner(s) 146 can determine the location of objects or other environmental features including traffic signs, trees, shrubs, neighboring vehicles, pedestrians, etc.

The path planner(s) 146 can include instructions to determine path(s), current autonomous driving maneuvers for the MED vehicle(s) 106, future autonomous driving maneuvers and/or modifications to current autonomous driving maneuvers based on data acquired by the sensor system(s) 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle, changing travel lanes, merging into a travel lane, and/or reversing, just to name a few possibilities. The path planner(s) 146 can include instructions to cause, directly or indirectly, such autonomous driving maneuvers to be implemented. The path planner(s) 146 can include instructions to execute various vehicle functions and/or to transmit data to, receive data from, interact with, and/or control the MED vehicle(s) 106 or one or more systems thereof (e.g. one or more of vehicle system(s) 148).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the drawings, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the maintenance conditions enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An autonomous mobile energy delivery vehicle, comprising:
    a communications device for communicating with a vehicle and a remote source;
    a processor operatively connected to the communications device; and
    a first memory operatively connected to the processor, the first memory storing executable instructions that, when executed by the processor, cause the processor to:
        identify a request for re-energization received from the vehicle via the communications device, the request for re-energization communicated from the vehicle, without an action by a user of the vehicle, in response to a determination that a current energy source level of the vehicle is less than a threshold energy source level;
        receive data associated with a schedule of the user, the data having been stored in a second memory;
        identify, based on the data associated with the schedule of the user, 1) a forthcoming location of the vehicle where the vehicle will be non-operational, and 2) a window of time when the vehicle will be located at the forthcoming location;
        receive a communication to cause the autonomous mobile energy delivery (MED) vehicle to be dispatched, the communication communicated from the remote source in response to a determination that the autonomous MED vehicle has been identified, from among one or more autonomous MED vehicles, as able to arrive at the forthcoming location at a time, within the window of time, that is earlier than any other of the one or more autonomous MED vehicles;
        cause the autonomous MED vehicle to be dispatched to be at the forthcoming location within the window of time to re-energize the vehicle while the vehicle is located at the forthcoming location; and
        cause the autonomous MED vehicle to re-energize the vehicle.

2. The autonomous mobile energy delivery vehicle of claim 1, wherein the request received from the vehicle further includes a type of energy source stored in an energy storage system of the vehicle.

3. The autonomous mobile energy delivery vehicle of claim 2, wherein the instructions that cause the autonomous MED vehicle to be dispatched further include the type of energy source to be used for re-energizing the vehicle.

4. The autonomous mobile energy delivery vehicle of claim 2, wherein the communication communicated from the remote source is further in response to a determination that a type of energy source stored at the autonomous MED vehicle and the type of energy source stored in the energy storage system of the vehicle are the same.

5. The autonomous mobile energy delivery vehicle of claim 1, wherein the second memory further stores instructions to:
    identify a quantity of energy source stored at the autonomous MED vehicle; and identify a quantity of energy source needed to re-energize the vehicle, wherein the autonomous MED vehicle is identified from the one or more autonomous MED vehicles based on the quantity of energy source stored at the autonomous MED vehicle being greater than the quantity of energy source needed to re-energize the vehicle.

6. The autonomous mobile energy delivery vehicle of claim 1, wherein the second memory stores data corresponding to the forthcoming location of the vehicle, and wherein the instructions that identify the forthcoming location of the vehicle cause the processor to access the second memory to identify the forthcoming location of the vehicle.

7. The autonomous mobile energy delivery vehicle of claim 6, wherein the data stored at the second memory comprise calendar data associated with any of 1) an owner of the vehicle, 2) an operator of the vehicle, or 3) a passenger of the vehicle.

8. The autonomous mobile energy delivery vehicle of claim 6, wherein the data stored at the second memory further comprise:
  recordations of locations of the vehicle and times associated therewith for a route of the vehicle; and
  a learned travel pattern based on the locations and associated times recorded for the vehicle, the learned travel pattern being the data corresponding to the forthcoming location of the vehicle.

9. A method for automatically re-energizing a vehicle, the method comprising:
  identifying, by a processor of an autonomous mobile energy delivery (MED) vehicle, a request for re-energization received from the vehicle via a communications device of the autonomous MED vehicle, the request for re-energization communicated from the vehicle, without an action by a user of the vehicle, in response to a determination that a current energy source level of the vehicle is less than a threshold energy source level;
  receiving, by the processor, data associated with a schedule of the user, the data having been stored in a memory;
  identifying, by the processor and based on the data associated with the schedule of the user, 1) a forthcoming location of the vehicle where the vehicle will be non-operational, and 2) a window of time when the vehicle will be located at the forthcoming location;
  receiving, by the processor, a communication to cause the autonomous MED vehicle to be dispatched, the communication communicated from a remote source in response to a determination that the autonomous MED vehicle has been identified, from among one or more autonomous MED vehicles, as able to arrive at the forthcoming location at a time, within the window of time, that is earlier than any other of the one or more autonomous MED vehicles;
  causing, by the processor, the autonomous MED vehicle to be dispatched to be at the forthcoming location within the window of time to re-energize the vehicle while the vehicle is located at the forthcoming location; and
  causing, by the processor, the autonomous MED vehicle to re-energize the vehicle.

10. The method of claim 9, wherein the request received from the vehicle further includes a type of energy source stored in an energy storage system of the vehicle.

11. The method of claim 10, wherein the causing the autonomous MED vehicle to be dispatched is based on the type of energy source to be used for re-energizing the vehicle.

12. The method of claim 10, wherein the communication communicated from the remote source is further in response to a determination that a type of energy source stored at the autonomous MED vehicle and the type of energy source stored in the energy storage system of the vehicle are the same.

13. The method of claim 9, further comprising:
  identifying, by the processor, a quantity of energy source stored at the autonomous MED vehicle; and
  identifying by the processor, a quantity of energy source needed to re-energize the vehicle, wherein the autonomous MED vehicle is identified from the one or more autonomous MED vehicles based on the quantity of energy source stored at the autonomous MED vehicle being greater than the quantity of energy source needed to re-energize the vehicle.

14. The method of claim 9, wherein the memory stores data corresponding to the forthcoming location of the vehicle, and wherein the identifying the forthcoming location of the vehicle comprises accessing the memory to identify the forthcoming location of the vehicle.

15. The method of claim 14, wherein the data stored at the memory comprise calendar data associated with any of 1) an owner of the vehicle, 2) an operator of the vehicle, or 3) a passenger of the vehicle.

16. The method of claim 14, wherein the data stored at the memory further comprise:
  recordations of locations of the vehicle and times associated therewith for a route of the vehicle; and
  a learned travel pattern based on the locations and associated times recorded for the vehicle, the learned travel pattern being the data corresponding to the forthcoming location of the vehicle.

17. A non-transitory computer-readable medium for automatically re-energizing a vehicle, the non-transitory computer-readable medium including instructions that when executed by one or more processors, disposed on an autonomous mobile energy delivery vehicle, cause the one or more processors to:
  identify a request for re-energization received from the vehicle via a communications device of the autonomous mobile energy delivery (MED) vehicle, the request for re-energization communicated from the vehicle, without an action by a user of the vehicle, in response to a determination that a current energy source level of the vehicle is less than a threshold energy source level;
  receive data associated with a schedule of the user, the data having been stored in a memory;
  identify, based on the data associated with the schedule of the user, 1) a forthcoming location of the vehicle where the vehicle will be non-operational, and 2) a window of time when the vehicle will be located at the forthcoming location;
  receive a communication to cause the autonomous MED vehicle to be dispatched, the communication communicated from a remote source in response to a determination that the autonomous MED vehicle has been identified, from among one or more autonomous MED vehicles, as able to arrive at the forthcoming location at a time, within the window of time, that is earlier than any other of the one or more autonomous MED vehicles;

cause the autonomous MED vehicle to be dispatched to be at the forthcoming location within the window of time to re-energize the vehicle while the vehicle is located at the forthcoming location; and cause the autonomous MED vehicle to re-energize the vehicle.

18. The non-transitory computer-readable medium of claim 17, wherein the request received from the vehicle further includes a type of energy source stored in an energy storage system of the vehicle, and wherein the instructions that cause the autonomous MED vehicle to be dispatched further include the type of energy source to be used for re-energizing the vehicle.

19. The non-transitory computer-readable medium of claim 17, further include instructions that when executed by one or more processors cause the one or more processors to:

identify a quantity of energy source stored at the autonomous MED vehicle; and identify a quantity of energy source needed to re-energize the vehicle, wherein the autonomous MED vehicle is identified from the one or more autonomous MED vehicles based on the quantity of energy source stored at the autonomous MED vehicle being greater than the quantity of energy source needed to re-energize the vehicle.

20. The non-transitory computer-readable medium of claim 17, wherein the memory stores data corresponding to the forthcoming location of the vehicle, and wherein the instructions that identify the forthcoming location of the vehicle comprise instructions that access the memory to identify the forthcoming location of the vehicle.

* * * * *